March 21, 1933.　　J. A. BUTTRESS　　1,902,216
EXTERIOR GRIPPING DEVICE
Filed Aug. 31, 1931　　2 Sheets-Sheet 1
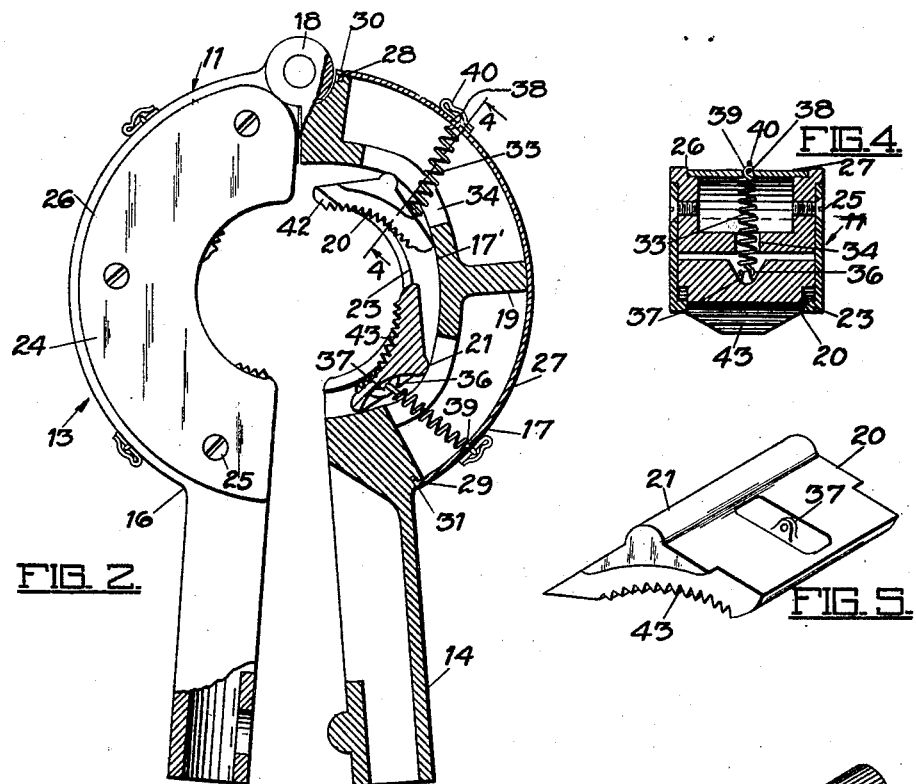
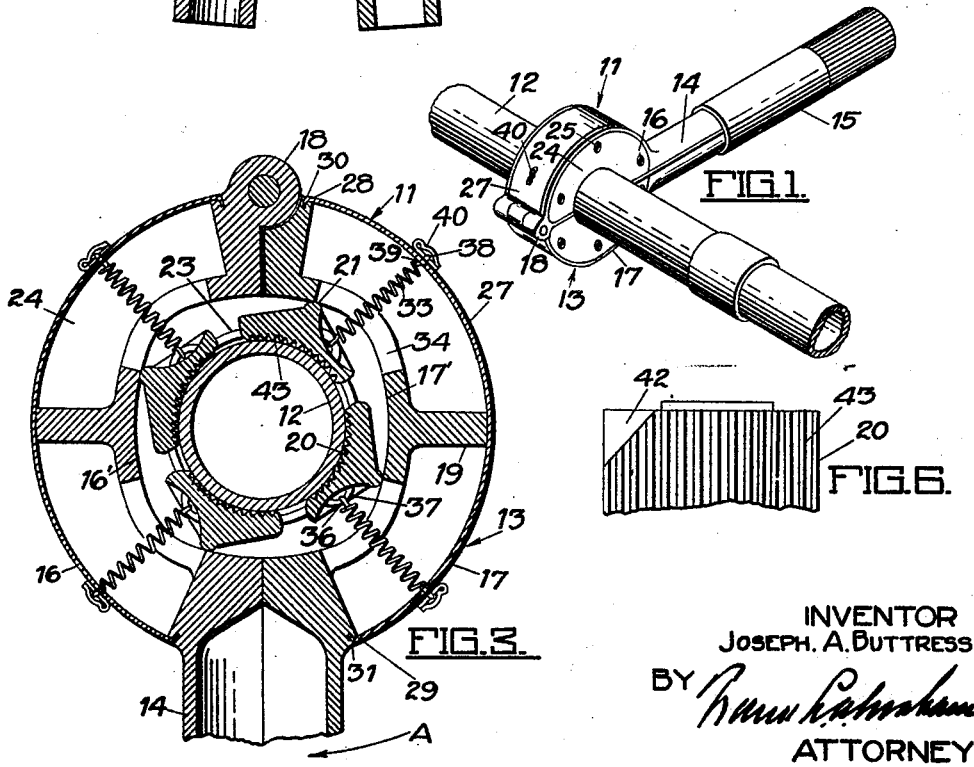
INVENTOR
JOSEPH. A. BUTTRESS
BY
ATTORNEY March 21, 1933.        J. A. BUTTRESS        1,902,216
EXTERIOR GRIPPING DEVICE
Filed Aug. 31, 1931        2 Sheets-Sheet 2
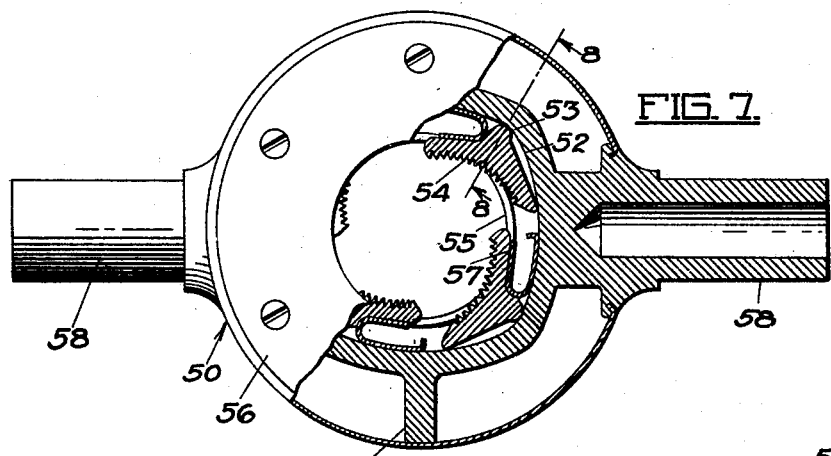
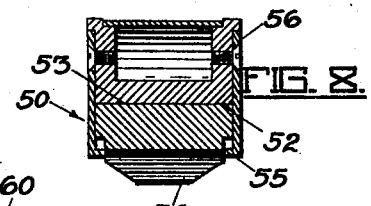
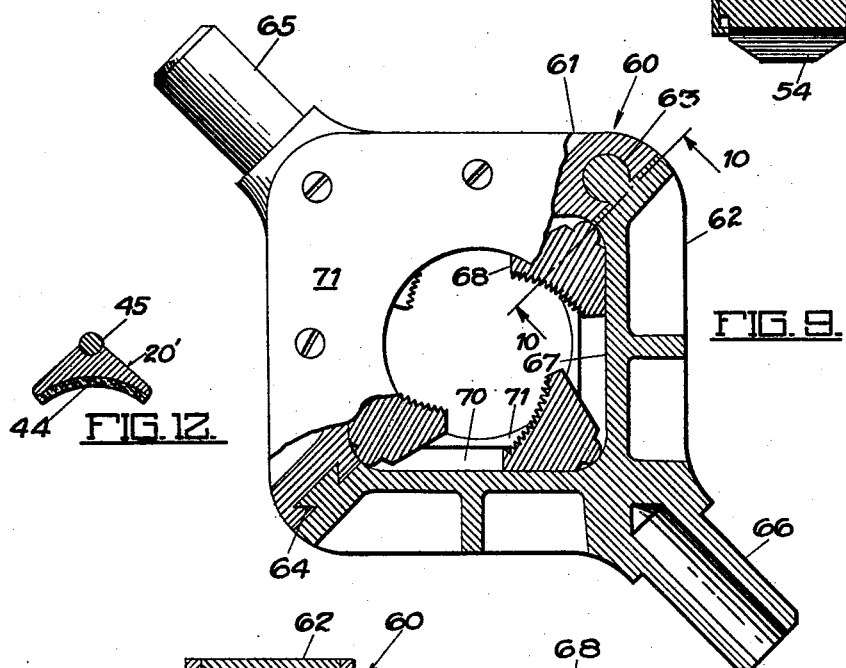
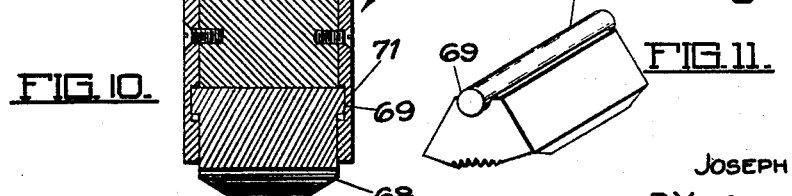
INVENTOR
JOSEPH A. BUTTRESS
BY
ATTORNEY Patented Mar. 21, 1933

1,902,216

UNITED STATES PATENT OFFICE

JOSEPH A. BUTTRESS, OF SOUTH PASADENA, CALIFORNIA, ASSIGNOR OF ONE-HALF TO GEORGE PARKER, OF JACKSON, MISSISSIPPI

EXTERIOR GRIPPING DEVICE

Application filed August 31, 1931. Serial No. 560,406.

This invention has to do in a general way with outside gripping devices such as are used for engaging and rotating or holding against rotation any substantially cylindrical member such as a clutch drum, a pipe, or the like.

The invention is shown and described herein as being embodied in an outside pipe wrench and while the tool contemplated by this invention may, within certain limitations, be used to accommodate various sizes of pipe or the like, I consider it preferable to use one tool for each size of pipe. This use has one distinct advantage in that the entire periphery of the pipe may be positively engaged by the gripping surfaces.

The device contemplated by this invention is of simple form and construction and is made in a manner such that the parts subjected to wear are small and inexpensive and can be easily and quickly removed and replaced.

The general construction of the device contemplated by this invention comprises a body member which may be described as being ring shaped, the opening therein being substantially polygonal in cross section. Mounted in this opening is provided a plurality of gripping shoes, such shoes may vary in number depending upon the shape of the opening and the type of gripping action which is to be obtained, and it is one important feature of the invention that each of the shoes is provided with a bearing surface arranged and constructed so that the shoe, when the bearing surface engages the inner surface of the opening, acts in the nature of a rocker in that it may be tilted from one side to the other relative to the engaged surface. Means are provided for limiting the movement of the shoes relative to the body portion and in a preferred form of my invention I associate the shoes with yieldable means adapted to normally tilt the shoes so that one edge of each shoe projects inwardly into the body opening further than the other edge. This form of my invention has the advantage that a gripping action is obtained during one direction of rotation only and in this manner I obtain a ratcheting effect which has many obvious advantages over a unidirectional wrench. This ratchet construction, however, has one disadvantage in that the wrench must be taken off and turned over in order to reverse the direction in which the engaged member is rotated, and with this in mind I have embodied my invention in a modified form which I may describe as being double acting in that it does not have the ratcheting effect mentioned above but will turn the engaged member in either direction.

It will be understood, of course, that the principal features of construction outlined above may be embodied in various forms. For example, the wrench may be embodied in a hinge structure adapted to be placed upon a pipe or other member at any point throughout its length, or it may be embodied in a substantially closed structure which I will hereafter refer to as an end wrench, such structure also being particularly adapted for use in various types of clutches and the like.

In still another form of my invention I employ what is in effect an integral body structure, such structure, however, being made in two pieces adapted to be slidably engaged with one another so as to form a singe integral unit. Numerous other forms and modifications employing the same principles of construction and operation will no doubt appear to those familiar with the art.

In order that the wrench or gripping device will readily slip over the end of the member to be engaged or gripped, I consider it an important feature of the invention that the gripping shoes mentioned above be provided with beveled corners so that the insertion of a member to be acted upon will automatically force the shoes away from their tilted position into a position where the gripping surfaces of any of the shoes completely encompasses the member to be gripped.

It will be apparent from the fact that I employ an opening in the housing which is polygonal in shape, that the action of the wrench is based upon the principle of an inclined plane or wedge, since the shoes are normally positioned in the corners or regions of greatest diameter in the opening and the movement of the body relative to the shoes tends to decrease the diameter of the body which contains the shoe bearings. In this manner the shoes are forced inwardly in radial directions and the gripping pressure applied by the shoes to the pipe surface increases with the torque applied to the handle. Since the pipe is completely encompassed by the shoes there is no crushing action like that found in the ordinary pipe wrench, and inasmuch as the gripping pressure is radially applied there is no tendency to slip.

It is to be understood that while I have referred to the body opening as being polygonal in form, this description is meant to apply within certain limits to a body opening wherein the various faces are curved on a radius substantially greater than the radius of the body. In other words the body opening might be more properly described as being of varying diameter and the shoes are situated in the regions of greatest diameter and are adapted to be moved by virtue of their engagement with a pipe or other engaged member toward the region of smallest diameter, such movement being effective to force the gripping surfaces of the shoes into positive pressure engagement with the outer surface of the engaged member.

The details in the construction of certain preferred forms of my invention, together with other objects attending its production, will be best understood from the following description of the accompanying drawings which are chosen for illustrative purposes only, and in which Fig. 1 is a perspective view showing a preferred form of my invention embodied in a wrench and engaging a pipe;

Fig. 2 is an end view partly in section illustrating the details in the construction of the wrench shown in Fig. 1;

Fig. 3 is a sectional end view similar to Fig. 2 but illustrating the manner in which the gripping shoes are forced into engagement with the gripped member when the wrench is in operation;

Fig. 4 is a sectional view taken in a plane represented by the line 4—4 in Fig. 2;

Fig. 5 is a perspective view illustrating a preferred form of shoe used in a gripping device of the type shown;

Fig. 6 is an end view illustrating the manner in which the corners of the shoes are beveled for the purpose mentioned above;

Fig. 7 is an end view with parts broken away illustrating a modified form of my invention;

Fig. 8 is a sectional view taken in a plane represented by the line 8—8 in Fig. 7;

Fig. 9 is an end view partly broken away illustrating still another modified form of my invention;

Fig. 10 is a sectional view taken in a plane represented by the line 10—10 in Fig. 9;

Fig. 11 is a perspective view illustrating the construction of the shoe used in connection with the wrench shown in Fig. 9;

Fig. 12 is a sectional view illustrating still another modified form of shoe and showing the same as being provided with a gripping surface formed of some fiberous material.

Referring now to the drawings and with particular reference to Fig. 1, reference numeral 11 indicates a wrench or gripping device which is shown as being mounted in gripping engagement with a pipe 12. The wrench 11 comprises a body portion 13 which has a handle portion 14 adapted to be received in a sleeve 15 of any desired length to give the desired leverage or pressure on the wrench. The handle 14 is preferably tapered so that the sleeve may be wedged therein and in this particular form of my invention the tapered handle permits the two segments of the body being forced into locked engagement with each other. It will be understood, of course, that handles of any length may be used without the sleeve 15.

Referring more particularly to Figs. 2 and 3, it will be observed that the body 13 is formed in two sections 16 and 17, which are hinged together as indicated at 18. These two sections may be described as being of channel construction, both having inner faces 16' and 17' respectively which are substantially solid. The channels are reinforced by ribs 19. The inner faces of the segments cooperate to form what I have herein described as a substantially polygonal opening, as is clearly illustrated in Fig. 3. This opening is not absolutely square in that the faces thereof are flat, but as shown in the drawings is formed so that the faces are curved on radii which are substantially greater than the average radius of the body opening. Reference numeral 20 is used to identify a plurality of shoes which in the construction described, are four in number, such shoes being positioned within the body opening and formed with bearing projections 21 adapted to engage the inner surfaces 16' and 17' of such opening. These shoes, as illustrated in Figs. 4 and 5, are provided with end projections which are adapted to be received behind flanges 23 formed on the inner or under surfaces of face cover plates 24. These cover plates are secured to the main body portion by means of counter sunk screws 25. The outer periphery of the body sections are provided with shoulders 26 which define a recess adapted to receive peripheral cover members 27. Such members are sprung or clipped into place upon the body sections and are retained in place by means of end hooks 28 and 29 which are received in recesses 30 and 31 formed in the body segments.

It was pointed out in the early part of the specification that in the preferred construction of my invention the gripping shoes were formed so as to have a unidirectional or ratcheting action upon the gripping member. This action is accomplished by providing the shoes with yieldable means for tilting them relative to the inner surface of the body opening. Various means may be employed for effecting this tilting action, and in Figs. 2 to 4 inclusive I show such means as comprising tension springs 33 which extend through openings 34 provided in the inner faces of the body segments, each of such springs having one end portion 36 attached to the corresponding shoe through the medium of an eye 37 formed on the shoe and the other end portion 38 extending through an opening 39 in the peripheral cover 27 where it receives a key or other suitable locking pin 40. In this manner the shoes are tilted as indicated in Fig. 2 so that the corresponding corner of each shoe projects inwardly past the inner circular edge of the cover plates to a position where they will engage a member encompassed by the tool or gripping device. The springs also have the function of yieldably forcing the shoes into the corners of the polygonal openings or into the regions of greatest cross sectional diameter.

In order that the tool may be conveniently slid over the end of a pipe or the like, I bevel the inwardly projecting corners of the shoes as indicated by reference numeral 42. The gripping surfaces of the shoes are shown as being serrated as indicated at 43. It will be understood, of course, that any type of knurling or cross sectional serrations may be used on the gripping surfaces and in certain instances where the wrench is to be used in connection with a soft, highly polished or otherwise easily marred pipe, I have found it preferable to employ a gripping surface composed of some suitable fibrous material such as is indicated by reference numeral 44 in Fig. 12. The shoe shown in Fig. 12 differs from that shown in the figures described above in that it is provided with a roller bearing 45 which is received in a suitable groove in the rear surface of the shoe and is independent of the main shoe body 20'. This construction under certain circumstances where a great turning force is applied to the handle, gives a smoother action and quicker release than the shoe described above. It will be understood, of course, that the roller bearing may be employed in conjunction with any of the shoes described herein.

In the operation of the gripping device which is perhaps best illustrated in Fig. 2, it will be observed that the pipe 12 received therein is engaged through substantially its entire periphery by the inner engaging surfaces of the shoes 20. When the wrench is rotated in the general direction of the arrow A, Fig. 3, the shoes by virtue of their engagement with the pipe remains stationary so that the relative movement between the shoes and the body brings the shoes to a position in the body where the cross sectional diameter is much less than the point normally occupied by the shoes. Such movement obviously forces the shoes into pressure engagement with the pipe and the pressure applied at the gripping surfaces increases with the torque applied to the handle until the pipe is rotated. When the wrench body is moved in the opposite direction the shoes will remain stationary by virtue of their engagement with the pipe until the body has been rotated to a point at which the cross sectional diameter between the bearing surfaces of the shoes is such that the pressure applied to such surfaces by a body is less than the frictional resistance offered by the pipe. This ordinarily occurs when the shoes are drawn back into the corners of the body opening and at this time the shoes move with the body until the direction of rotation is again reversed thus affording the ratcheting action discussed above.

The springs 33, as pointed out above, assist in drawing the shoes back into the corners of the openings during the ratcheting or reversed rotation. The modification shown in Fig. 7 is based upon the same principle of operation as that just described. This tool, however, instead of being formed in two sections hinged together, is formed as an integral unit and comprises what I have heretofore referred to as an end wrench in that when the device is used as a wrench it can be used only under circumstances in which it can be moved over the end of the member to be engaged. This wrench comprises a body member 50 which is of substantially ring shape and is preferably formed of channel material having reinforcing ribs 51. The opening of the body, like the one described above, is made substantially polygonal in shape and is defined by a plurality of curved and angularly disposed faces 52. These faces are adapted to be engaged by bearing portions 53 on shoes 54 which are held within the openings by flanges 55 on cover plates 56. In this form of my invention, which like the form described above is adapted for ratcheting action, I provide each of the shoes with a compression spring 57. These springs are made of some resilient metal and are substantially U-shaped, preferably being secured to the shoes by means of welding or suitable rivets. The action of the springs is the same as the action of the tension spring shown in Figs. 2 and 3 in that they normally tilt the shoes as indicated in Fig. 7 and also act to force the shoes toward the corners of the openings. In this form of my invention it is not necessary to provide the web of material which defines the body opening with apertures, which was the case in the form shown in Figs. 2 and 3. It is to be understood, however, that the tilting springs used in Fig. 7 may be employed in the form of my invention shown in Figs. 2 and 3 and that the body member shown in Fig. 7 may optionally be provided with the aperture mentioned above to permit the use of springs of the type shown in Fig. 2. Reference numeral 58 indicates suitable handles which are formed of the body member and which may be used in conjunction with sleeves or pipes of the type shown in Fig. 1 for operating the wrench.

In the form of my invention shown in Fig. 9, the body member 60 is made in two sections 61 and 62, such sections being provided with suitable dove tail connections 63 and 64 so that they may be interconnected to form what is in effect an integral unit. The body segments 61 and 62 are provided with handle projections 65 and 66 similar to those described in connection with Fig. 7. The opening in the body in this form of my invention differs from the openings described in connection with Figs. 2 and 7 in that the sides or faces thereof are straight or substantially flat, such faces being indicated by reference numeral 67. It will be understood, of course, that the same type of opening as was discussed in connection with the two above figures may be used in this form of my invention and vice versa. In this form of my invention the shoes 68 are shown as having substantially cylindrical end projections 69 which are received in grooves or channels 70 formed in cover plates 71. This form of wrench further differentiates from the form described above in that the shoes are adapted for unrestricted movement in either direction so that the wrench does not have the ratcheting action described above but will grip an engaged member during either direction of its movement. The gripping action is, of course, accomplished by the movement of the shoes along the surface engaged by their bearing portions toward the regions of smallest diameter and to a point as they are forced into firm pressure engagement with the gripping member. To release the wrench the body is rotated in a reverse direction until the shoes move into the corners of the body openings where the wrench may be withdrawn from the engaged member. It will be understood in this connection that the same type of shoes and shoe control springs shown and described in connection with Figs. 2 and 7 may be employed in connection with the body unit shown in Fig. 9 to obtain a ratchet wrench. Similarly a double acting wrench may be formed from body members of the type shown in Figs. 2 and 7 by employing in these bodies, shoe members of the general type shown in Fig. 9.

It is to be understood that while I have herein described and illustrated certain preferred forms of my invention, the invention is not limited to any of the precise constructions described above, but includes within its scope whatever changes fairly come within the spirit of the appended claims.

I claim as my invention:

1. An outside gripping device embodying: a body having a polygonal opening therein; a handle on said body; a plurality of floating gripping shoes in said opening having bearing projections engaging the inner face of said opening; means on said body for limiting the radial movement of said shoes into said opening; and yieldable means for normally tilting said shoes on said bearing projections relative to the engaged faces in said opening.

2. An outside gripping device embodying: a body having a polygonal opening therein; gripping shoes in said opening; a bearing projection on each of said shoes slidably engaging the inner face of said opening and adapted to tiltably support said shoes relative to the respective engaging faces; and compression spring means mounted on the back of each shoe in sliding engagement with said inner face for tilting said shoes in said opening.

3. An outside gripping device embodying: a body having a polygonal opening therein; gripping shoes in said opening; a bearing projection on each of said shoes slidably engaging the inner face of said opening and adapted to tiltably support said shoes relative to the respective engaging faces; and a hair pin spring mounted on the back of each shoe in sliding engagement with said inner face for tilting said shoes in said opening.

4. An outside gripping device embodying: a body comprising a main channeled portion having a polygonal opening therein; peripheral cover means on said main channeled portion; a plurality of gripping shoes in said opening; bearing means on said shoes engaging the inner surface of said main channeled portion; and tension springs each extending through an opening in said main channel portion and having its ends secured to said peripheral cover and one of said shoes respectively.

5. An outside gripping device embodying: a body comprising a main channeled portion having a polygonal opening therein; peripheral cover means on said main channeled portion; a plurality of gripping shoes in said opening; bearing means on said shoes engaging the inner surface of said main channeled portion; and tension springs each extending through an opening in said main channel portion and having its ends secured to said peripheral cover and one of said shoes respectively, each of said springs being secured to its corresponding shoe at one side of the bearing portion on said shoe.

6. An outside gripping device embodying: a body having a polygonal opening therein; a handle on said body; a plurality of gripping shoes in said opening; projections on the ends of said shoes; and cover plates on said body having flanges adapted to limit the inward movement of said shoes.

7. An outside gripping device embodying: a body having a polygonal opening therein; a handle on said body; a plurality of gripping shoes in said opening; projections on the ends of said shoes; and cover plates on said body having flanges adapted to limit the inward movement of said shoes, said cover plates having their inner edges formed so as to provide substantially circular openings therein.

8. An outside gripping device embodying: a substantially ring shaped body having an opening of varying diameter; shoes in said opening each having a bearing projection intermediate its ends slidable and rocking upon, and engaging the surface thereof in the regions of greatest diameter when in inoperative position and adapted to move toward the regions of least diameter for gripping a member received in said opening, said body being formed in two sections hinged together; and means on said body for holding said shoes against inward radial movement into said opening.

9. An outside gripping device embodying: a substantially ring shaped body having an opening of varying diameter; shoes in said opening each having a bearing projection intermediate its ends slidable and rocking upon, and engaging the surface thereof in the regions of greatest diameter when in inoperative position and adapted to move toward the regions of least diameter for gripping a member received in said opening, said body being formed in two sections hinged together; means on said body for holding said shoes against inward radial movement into said opening; and a handle on said body at the side opposite the hinge.

10. An outside gripping device embodying: a substantially ring shaped body having an opening of varying diameter; and shoes in said opening each having a bearing projection engaging the surface thereof in the regions of greatest diameter when in inoperative position and adapted to move toward the regions of least diameter for gripping a member received in said opening, said body being formed in two sections slidably attached and a handle on each section.

11. For use in a tool of the class described: a shoe having an inner pipe engaging face and rear faces angularly disposed relative to each other so as to converge toward and terminate in a bearing groove in the rear surface of said shoe; and bearing means in said groove, said bearing means consisting of a cylindrical roller mounted in said bearing groove.

In testimony whereof, I have hereunto set my hand at Los Angeles, California, this 22nd day of August 1931.

JOSEPH A. BUTTRESS.